April 4, 1967 — G. J. BURY — 3,312,805
ALTERNATE ACTION MECHANISM
Filed March 31, 1965 — 2 Sheets-Sheet 1
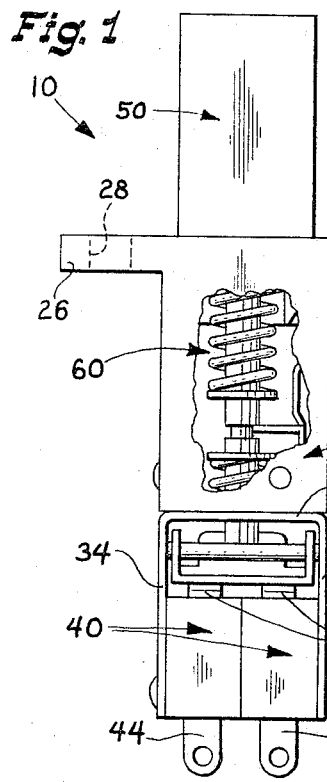
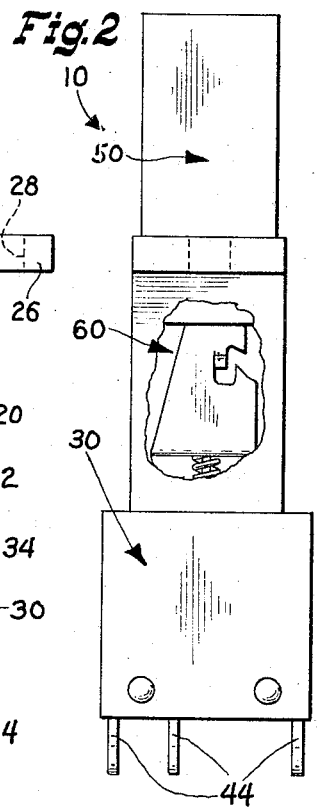
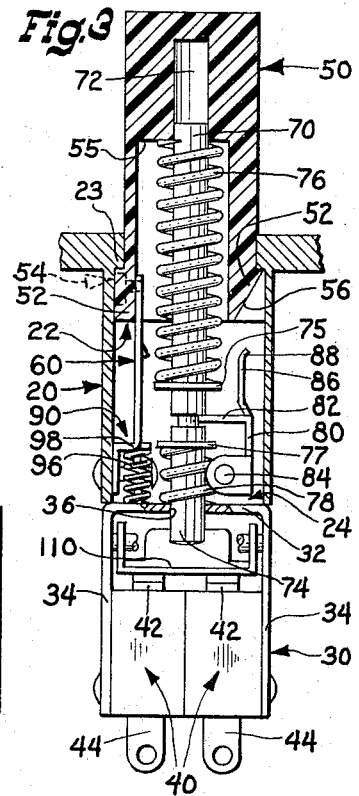
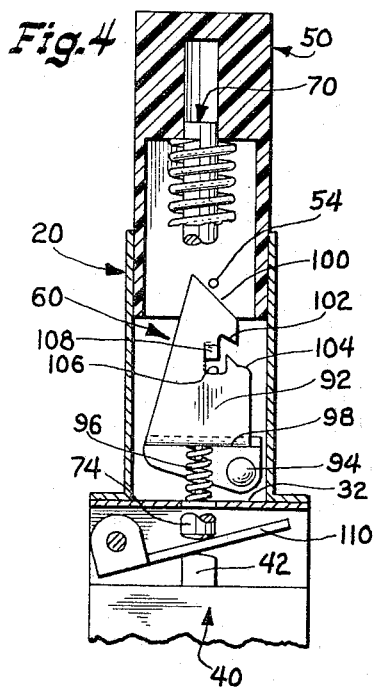
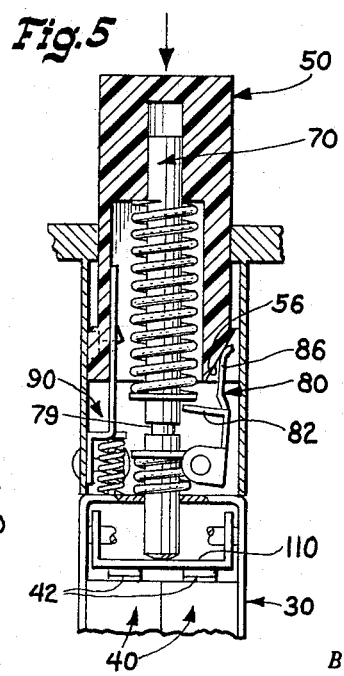
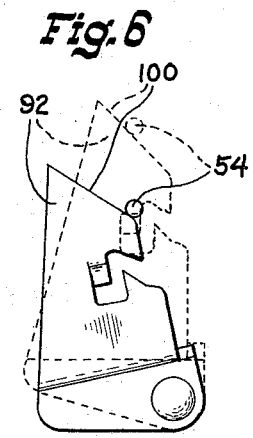
INVENTOR.
George J. Bury
BY
His Att'ys April 4, 1967  G. J. BURY  3,312,805
ALTERNATE ACTION MECHANISM
Filed March 31, 1965  2 Sheets-Sheet 2
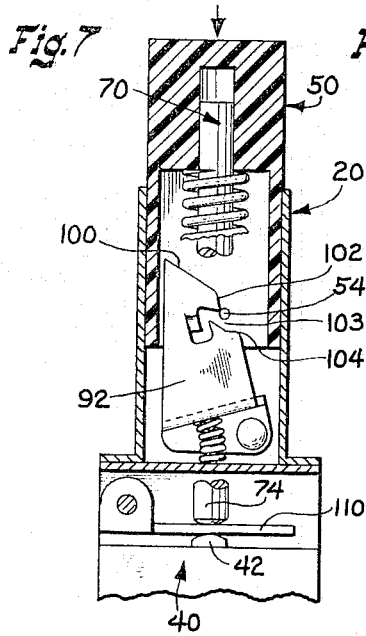
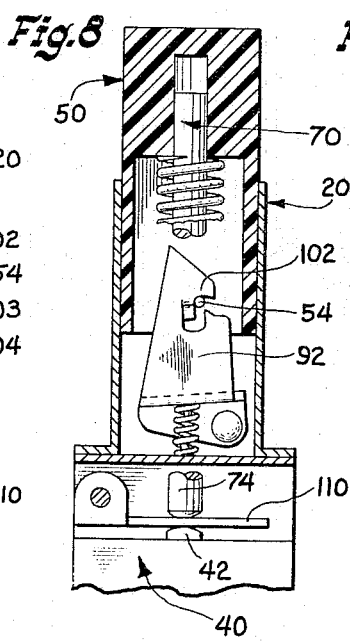
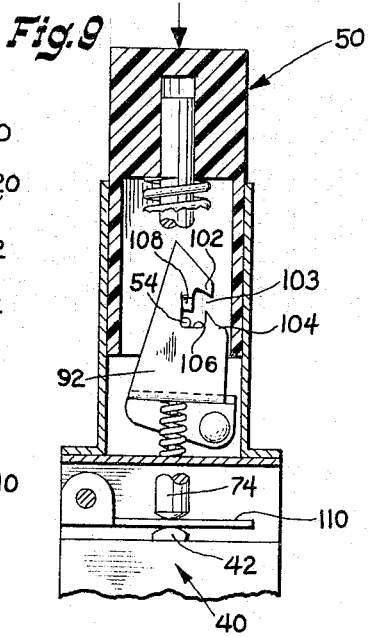
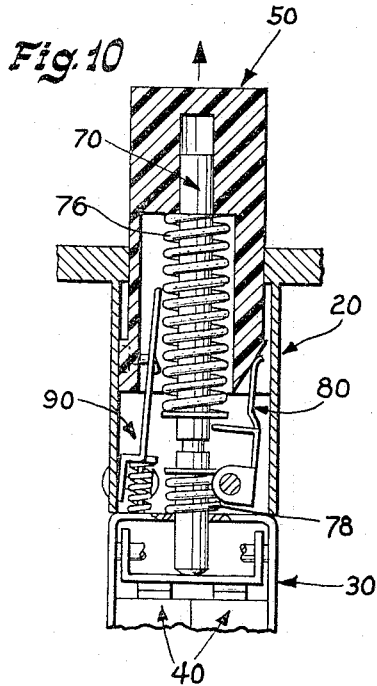
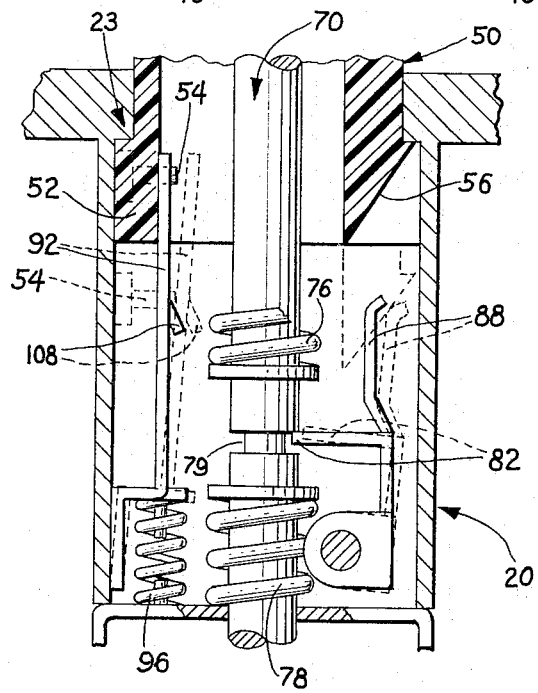
INVENTOR.
George J. Bury
BY
His Att'ys

United States Patent Office 3,312,805
Patented Apr. 4, 1967

3,312,805
ALTERNATE ACTION MECHANISM
George J. Bury, Antioch, Ill., assignor to Illinois Tool Works Inc., Chicago, Ill., a corporation of Delaware
Filed Mar. 31, 1965, Ser. No. 444,309
21 Claims. (Cl. 200—159)

The present invention relates to a new and improved alternate action mechanism for control devices such as switches, and more particularly, to a mechanical actuator and release mechanism which maintains control devices such as switches in either of two states when operated.

Many new innovations have been developed in the electrical control field which have advanced the state of the art to a high level, and efforts are constantly being made to meet the challenges of this rapidly growing field of technology. In one area of this field—repetitive actuator and release mechanisms or as they are commonly known, alternate action mechanisms—there is a need for a long-lived, quick acting mechanism which is essentially tease proof in operation. These demands have not been entirely met by devices already known and existing.

Accordingly, it is an object of the present invention to provide an alternate action mechanism which can be repeatedly operated over long periods without interruption, and provides a quick response to manual actuation, and yet is capable of effectively maintaining a control device such as a switch in either of two states when operated.

It is another object of the present invention to provide an alternate action mechanism which is reliable, provides a positive, uninterrupted action, and prevents any mechanical deviation.

A still further object of the present invention is to provide an alternate action mechanism which cannot be inadvertently actuated, and has a high shock-vibration resistance.

Yet another object of the present invention is the provision of an alternate action mechanism which is relatively simple and inexpensive, and has a strong and rigid construction.

Still a further object of the present invention is the provision of a new and improved alternate action mechanism which can maintain a control device such as a switch in either of two states when manually actuated unidirectionally.

Yet still another object of the present invention is the provision of a new and improved alternate action mechanism which provides a visual or physical determination concerning the status of the switch or other control device.

Other objects and advantages will become apparent from the following description when taken in connection with the accompanying drawings wherein:

FIG. 1 is a fragmentary front elevational view of a switch assembly incorporating an alternate action mechanism constructed in accordance with the principles of the present invention;

FIG. 2 is a fragmentary side elevational view of the switch assembly shown in FIG. 1;

FIG. 3 is a front elevational view, partly in section, showing the constructional details of the alternate action mechanism;

FIG. 4 is a side elevational view, partly in section, showing additional constructional details of the alternate action mechanism;

FIG. 5 is a view similar to FIG. 3, but showing the relative positions of the elements comprising the alternate action mechanism during the initial stages of the operation thereof;

FIG. 6 is an enlarged view showing a dotted and full line position of the yieldable cam plate element forming a part of the alternate action mechanism from its position shown in FIG. 4 to the position it would assume during the initial stages of operation;

FIG. 7 is a side elevational view similar to FIG. 4, and showing further relative movement of the yieldable cam plate element as it proceeds to a locking position;

FIG. 8 is a side elevational view similar to FIG. 7, but showing the yieldable cam plate element in locked position with the remaining elements of the alternate action mechanism at rest;

FIG. 9 is a view similar to FIGS. 7-8, but showing the manner in which the yieldable cam plate element is disengaged from its locking position;

FIG. 10 is a view similar to FIG. 5, and illustrating the movement of the yieldable cam plate element during disengagement thereof; and FIG. 11 is an enlarged fragmentary front elevational view showing the relative position of the various elements from the position shown in FIG. 10 to that illustrated in FIG. 3.

Referring now to the drawings and first to FIGS. 1-4, there is shown a switch assembly 10 having a hollow casing 20, a bracket 30 secured to the lower end of the casing for mounting the switches 40, a push button 50 mounted in the other end of the hollow casing, and an alternate action mechanism generally indicated by the reference numeral 60. Although the alternate action mechanism 60 of the present invention can be used to operate a variety of control devices, it is preferably employed in connection with the various elements of the switch assembly 10 referred to above and now to be described in detail.

The hollow casing 20 has a pair of upper and lower open ends 22, 24 respectively (see FIG. 3). The open upper end 22 receives the push button 50, and the bracket member 30 is fixedly mounted to the casing adjacent the lower end 24 thereof. As best seen in FIG. 1, the hollow casing 20 is provided with a pair of flange elements 26, 26 projecting outwardly therefrom adjacent the open upper end thereof, each flange element 26 having apertures 28 extending therethrough for accepting elongated fastener elements in mounting the switch assembly 10 to a supporting panel.

The bracket member 30, as best seen in FIGS. 1 and 3, has a substantially U-shaped configuration defining a bight end portion 32 with a pair of spaced, generally parallel leg elements 34, 34 depending therefrom. The bight end portion 32 is provided with suitable means (not shown) for fixedly attaching the bracket member 30 to the hollow casing 20 adjacent the lower end 24 thereof. A through opening 36 (see FIG. 3) is formed in the bight end portion 32 in communicating fashion with the lower open end 24 for receiving the switch actuator rod of the alternate action mechanism 60 as will be described in detail below.

A pair of switches 40 are positioned in side by side relationship internally of the depending leg elements 34, 34 of the bracket 30 and secured thereto by any suitable means. The switches 40 are preferably of the precision switch type as shown, for example, in U.S. Patent No. 2,840,657 dated June 24, 1958. The particular details of the switches are not important except to note that the switch actuator or depressor buttons 42 thereof must be of the type which are spring loaded or biased toward a return position by a suitable spring means such as shown in the aforementioned patent. Each of the switches 40 have three terminals 44 extending downwardly therefrom, but it will be appreciated that the number, disposition and location of the terminals 44 may be varied as desired. It will also be understood that the number of switches disposed between the leg elements 34, 34 of the bracket 30 can be varied, it only being necessary to fixedly mount at least one switch between the leg elements.

The push button 50 is adapted to be mounted in the open upper end 22 of the hollow casing 20, and has a base or flange portion 52 laterally offset therefrom on opposite sides of the push button for underlying an overhanging shoulder or abutment 23 adjacent the open upper end 22 to prevent separation or removal of the push button 50 from the hollow casing 20. The major portion of the push button 50 is biased or resiliently urged outwardly of the hollow casing to the position shown in FIG. 3 as will be desecribed in detail below. The left side of the laterally offset flange or base portion 52 as viewed in FIG. 3 has a pin element 54 secured thereto, and the right hand portion of the laterally offset flange or base portion 52 is provided with a downwardly facing cam surface 56, the pin element 54 and cam surface 56 serving to engage and operate various elements of the alternate action mechanism 60 upon depression of the push button 50.

Reference is now made to FIGS. 3–4 for a specific description of the various elements constituting the alternate action mechanism 60. The basic constituent elements of the alternate action mechanism 60 include a spring urged switch actuator rod 70, a spring loaded restraining member 80 for the switch actuator rod, a yieldable cam plate assembly 90 capable of being moved to a position of latching engagement with the pin element 54, and if desired, a depressor plate 110. The switch actuator rod 70 has its upper end 72 fixedly attached to the push button 50, and its lower end 74 extending through the opening or passageway 36 provided in the bight end portion 32 of the bracket for direct or operative engagement with the spring loaded depressor buttons 42 of the switches 40. A pair of pre-loaded compressive coil springs 76, 78 are mounted in surrounding relationship to the switch actuator rod 70 adjacent the upper and lower ends 72, 74 thereof to resiliently urge the push button 50 outwardly of the hollow casing 20. It is to be noted that coil spring 76 is mounted in compressive relation between ring 75 secured to the switch actuator rod 70 and internal surface 55 of the push button whereas coil spring 78 is compressively mounted between ring 77 secured to the switch actuator rod 70 and the upper surface of the bight end portion 32.

The switch actuator rod 70 is incapable of being reciprocated until the spring loaded arm 82 of the restraining member 80 is moved out of the groove 79 formed in the switch actuator rod 70. This preferably occurs after a predetermined amount of compressive energy is built up in the spring means 76, 78 so that the switch actuator rod or plunger 70 is not moved into operative engagement with the depressor buttons 42 of the switches 40 until the push button 50 is depressed a sufficient distance. This will not only prevent inadvertent actuation of the switches 40, but will insure that the spring loaded depressor buttons 42 are engaged by a sufficient actuating force to effectuate depression thereof for controlling the movement of switch contacts mounted within the switches.

As best seen in FIG. 3, the restraining member 80 is pivotally mounted to the hollow casing by way of pivot shaft 84, and is resiliently urged in a counterclockwise direction by a torsion spring means (not shown) to position the spring loaded arm 82 into cooperative engagement with the complementary groove 79 of the switch actuator rod. A flexible finger element 86 extends in a direction substantially normal to the spring loaded arm 82 and has an upwardly and outwardly inclined surface 88 at the outer free extremity thereof which cooperates with the cam surface 56 formed on the push button 50. The cam surface 56 of the push button 50 and the flexible finger 86 are so aligned with respect to each other that upon depression of the push button 50, the cam surface 56 engages the outer surface 88 of the flexible finger 86 and moves the entire restraining member 80 in a clockwise direction as viewed in FIG. 3 causing withdrawal of the spring loaded arm 82 from the groove 79 for downward movement of the switch actuator rod 70. The specific time at which this occurs can be varied by changing the length of flexible finger 88, the size of groove 79, etc., but preferably the displacement of restraining member 80 takes place just before or simultaneously with the action of the yieldable cam plate assembly 90 to be presently discussed.

The cam plate assembly 90 is provided with an irregularly shaped cam plate 92 (see FIG. 4) which is loosely pivoted on shaft 94 to the hollow casing 20. The pivot shaft 94 has a length greater than the thickness of cam plate 92 to permit oscillatory and lateral movement of the cam plate about and along the axis of the pivot shaft. A coil spring means 96 is mounted between a lower shoulder 98 and the upper surface of the bight end portion 32 to resiliently urge the cam plate 92 in first and second directions aligned with planes which are respectively generally parallel to and perpendicular to the axis of the switch actuator rod 70. As viewed in FIG. 4, the cam plate 92 would be resiliently urged by the coil spring 96 in a clockwise or first direction which is generally parallel to the axis of the switch actuator rod whereas the cam plate 92 as viewed in FIG. 3 is normally biased in a second or counterclockwise direction which is generally perpendicular to the axis of the switch actuator rod 70.

The cam plate 92 is provided along its upper surface with a sloping caming edge 100 which cooperates with the pin element 54 in a manner to be described hereinafter. The caming edge 100 terminates along the side of the cam plate in a locking shoulder 102 for latching engagement with the pin means or element 54. An abutment or shoulder 104 is laterally outwardly offset and downwardly spaced from the locking shoulder 102 to aid in bringing the pin means 54 to a position of latching engagement with the cam plate 92. An opening 106 having a portion thereof positioned directly below the locking shoulder 102 and the ramp surface 108 provide disengagement of the pin means 54 and cam plate 92 from each other as will now be described.

When the push button 50 is depressed, the pin element 54 which is attached thereto will ride along the upper surface or caming edge 100 of the cam plate 92 displacing the cam plate from the dotted to the full line position shown in FIG. 6, thereby causing the cam plate to be moved in a first direction generally parallel with the axis of the switch actuator rod 70. As seen in FIG. 7, further depression of the push button 50 moves the pin element 54 past the caming edge 100 and along the side of the cam plate until it is received within the opening 103 between the locking shoulder 102 and the abutment 104. The abutment 104 prevents further relative movement of the pin element 54 and the cam plate 92 so that the pin element 54 will be received by the opening 103 and positioned in underlying engagement to the locking shoulder 102. As the cam plate 92 has been displaced from the dotted to the full line position shown in FIG. 6, it will be apparent that it will have a tendency to return to the dotted line position shown in FIG. 6, the result of which is to move the cam plate 92 relative to the pin element 54 such that it will be readily accepted by the opening 103 and positioned in latching engagement with the locking shoulder 102 of the cam plate. Since the cam plate 92 and the pin element 54 are designed to engage each other in such a fashion that the spring means associated therewith pull in generally opposite directions, there will be little chance for inadvertent separation of the pin element and cam plate 92 due to vibrations, shocks, jarring, etc.

The switch shown in FIG. 8 of the drawings is in a fully depressed, static condition by way of the interlocking arrangement established between the pin element 54 and the locking shoulder 102. To effectuate disengagement of the pin element 54 and cam plate 92, the push button is depressed again as shown in FIG. 9 to position the pin element 54 in the opening 106 located beneath the locking shoulder 102 and the ramp surface 108. It is to be noted that the cam plate as shown in FIG. 8 of the drawings has not completely returned to its at rest position, and thus there is a tendency, upon further depression of the push button 50, for the cam plate to be moved from left to right as viewed in FIG. 8 until the pin element 54 is positioned in alignment with the ramp surface 108 at the extreme left of the opening 106. Further depression of the push button 50 will be resisted by the bottom margin surrounding the opening 106 such that it becomes necessary to release the push button 50.

Upon so doing, the pin element 54 will ride up the gently tapering surface 108 of the cam plate 92 and thence along a flat face thereof until the pin element and cam plate are separated from each other. This relative separating movement of the pin element 54 and cam plate 92 is readily depicted in FIG. 11 of the drawings where the parts are shown in dotted line positions as they are being separated, and in full line positions when complete separation has taken place. It should also be noted that FIG. 11 shows the manner in which the restraining member 80 and the spring loaded arm 82 thereof are pivotally urged to a position of cooperative engagement with the switch actuator rod 70.

A depressor plate 110 is pivotally mounted to the leg elements 34 of the bracket 30, and is positioned intermediate the lower end 74 of the switch actuator and each spring loaded depressor button 42 for coaction therewith as best seen in FIG. 4 of the drawings. Upon depression of the push button 50, the depressor plate 110 will be moved about its pivot shaft by the lower end 74 of the switch actuator rod 70 to displace the spring loaded depressor means 42 of the switches 40. Upon return movement of the switch actuator rod 70, the depressor plate 110 will be moved by the spring loaded depressor buttons 42 to generally the position shown in FIG. 4 of the drawings. As indicated above, the switch actuator rod is displaced downwardly to move the depressor plate 110 either concurrently with or slightly prior to the action of the yieldable cam plate assembly 90.

Reference is now made to FIGS. 5–11 for a specific description of the operation of the alternate action mechanism between a latched and released position. When the push button 50 is moved downwardly relative to the hollow casing 20 as indicated diagrammatically by the arrow in FIG. 5, both the retaining member 80 and the yieldable cam plate assembly 90 come into operation. The cam plate 92 will be moved generally from the dotted to the full line position shown in FIG. 6 and the flexible finger 86 will be engaged by cam surface 56 to displace the spring loaded arm 82 out of the groove 79 so that the switch actuator rod 70 will be rapidly moved downwardly to displace the depressor plate 110 to actuate the spring loaded depressor buttons 42 of the switches 40. Further depression of the push button 50 as seen in FIG. 7 enables the pin element 54 to continue the movement of the cam plate 92 in a first direction generally within the confines of a plane parallel to the axis of the switch actuator rod 70. As the cam plate 92 is being cocked by the pin element 54, its natural tendency is to move in a second or opposite direction generally within the confines of the parallel plane when the pin element 54 is moved into the opening 103 between the locking shoulder 102 and the abutment 104 laterally offset therefrom. As a result, the locking shoulder 102 will be moved into overlying engagement with respect to the pin element 54 so as to maintain the push button and cam plate 92 in latching or locked engagement. The abutment 104 serves to prevent continued relative movement between the pin element 54 and the cam plate 92 to enable the above described latching engagement to take place.

When the push button 50 and yieldable cam plate assembly 90 are thus held in latching engagement, inadvertent or accidental disengagement thereof caused by jarring, vibrations and the like is quite difficult. At the same time, the alternate action mechanism is quick acting requiring a relatively low operating force to move the push button 50 and yieldable cam plate assembly 90 in latching engagement.

To effectuate disengagement of the push button 50 and yieldable cam plate assembly 90, the push button 50 is again actuated in a downward direction as seen in FIG. 9 of the drawings to position the pin element 54 in the opening 106 and to permit the cam plate 92 to move a further distance in its second or clockwise direction as viewed in FIG. 9 to align the pin element 54 and the ramp surface 108. When the pin element 54 is thus positioned, further relative movement between the pin element 54 and cam plate 92 is prevented since the pin element 54 is in direct bearing engagement with the bottom margin adjacent the opening 106. Thus, it becomes necessary to release the push button.

FIG. 10 shows the push button 50 just after it has been released, the coil springs 76, 78 of the switch actuator rod 70 aiding in returning the push button to its initial position. The pin element 54 will thus be moved by the springs 76, 78 up the ramp surface 108 and over a flat face of the cam plate 92 as shown from the dotted to the full line position in FIG. 11 of the drawings. During this relative separating movement, the cam plate 92 is moved in third and fourth directions generally opposite to each other within the confines of a plane generally perpendicular to the axis of the switch actuator rod. It will be noted that the spring 96 will be compressed to a greater extent as the pin element 54 moves up the ramp surface of the cam plate 92 creating a condition whereby the cam plate 92 has a tendency to return to its initial position, that is, from the dotted to the full line position shown in FIG. 11 of the drawings.

As the pin element and cam plate 92 are relatively separated from each other, the cam surface 56 is moved away from the flexible finger 88 to enable this finger and the spring loaded arm 82 associated therewith to be moved from the dotted to the full line position shown in FIG. 11 where the arm 82 is again positioned in captive relationship with respect to the groove 79 of the switch actuator rod 70. When the base portion 52 of the push button engages the overhanging shoulder 23 of the hollow casing, the parts will assume the initial position as best seen in FIGS. 3–4 of the drawings.

It will be apparent that the depressor plate 110 may be mounted either to the bracket 30 or the lower end 74 of the switch actuator rod 70 for straight reciprocatory movement. In certain instances such as where only a single switch is mounted within the bracket 30, the depressor plate 110 may be eliminated entirely with the lower end 74 of the switch actuator rod positioned in aligned relationship with the spring loaded depressor button 42 of the switch for engagement thereby. It will also be understood that the alternate action mechanism will operate without the retaining member 80 although this feature is preferably employed to prevent actuation of the switch or control device until the push button 50 has been depressed a sufficient distance.

From the foregoing, it will now be apparent that the present invention contemplates a novel and unique alternate action mechanism capable of being quickly moved from an at rest to a latched position and back again. The positive lock and high shock-vibration resistant feature combined with the ability to move rapidly between the latched and unlatched position makes the instant alternate action mechanism desirable for many commercial applications. While the preferred embodiment of the present invention has been shown and described herein, it is obvious that many structural details may be changed without departing from the spirit and scope of the appended claims.

I claim:
1. A switch assembly comprising, in combination, a hollow casing having open ends, at least one switch fixedly mounted relative to said hollow casing adjacent one end thereof and having spring loaded depressor means for controlling the movement of switch contacts mounted within said switch, a push button mounted in the other end of said hollow casing, a switch actuator having spring means associated therewith for resiliently urging a portion of said push button outwardly of said hollow casing, said switch actuator extending beyond the other end of said hollow for operative engagement with said spring loaded depressor means, and means for positioning and holding said switch actuator in operative engagement with the spring loaded depressor means of said switch including yieldable locking means mounted to said hollow casing and capable of being moved to a position of latching engagement with pin means associated with said push button when the latter is depressed for moving the switch actuator into operative engagement with said spring loaded depressor means.

2. The assembly set forth in claim 1 wherein said yieldable locking means is also capable of being moved out of latching engagement with said pin means upon further depression of said push button to move the switch actuator out of operative engagement with said spring loaded depressor means.

3. The assembly as defined in claim 1 including a pair of switches each having a spring loaded depressor means, and a depressor plate pivotally mounted relative to and positioned intermediate the lower end of said switch actuator and each of said spring loaded depressor means for coaction therewith.

4. The assembly set forth in claim 1 including a bracket member attached to said casing adjacent one open end thereof and having a through opening communicating with said one open end for receiving the switch actuator, said bracket member fixedly mounting at least one switch.

5. The assembly as set forth in claim 4 wherein said bracket member is substantially U-shaped in cross section and presents two leg portions, said leg portions having at least one switch secured thereto.

6. The assembly as set forth in claim 5 including a pair of switches mounted in side by side relation between the legs of said U-shaped bracket, and a depressor plate pivotally mounted to the legs of said U-shaped bracket and positioned intermediate the lower end of said switch actuator and the spring loaded depressor means of said switches for coaction therewith.

7. The assembly as set forth in claim 1 wherein said push button is provided with a laterally offset flange which underlies an overhanging shoulder adjacent one open end of said hollow casing to prevent removal of said push button therefrom.

8. The assembly as set forth in claim 1 including a spring loaded arm which is adapted to be accepted by a complementary groove formed in said switch actuator until a predetermined amount of compressive energy is built up in said spring means to enable said switch actuator to be moved in operative engagement with the spring loaded depressor means only when the push button is depressed a sufficient distance.

9. The assembly as set forth in claim 8 including means associated with said push button which engages and displaces said spring loaded arm only after a predetermined amount of push button displacement.

10. The assembly as set forth in claim 9 wherein said spring loaded arm is pivotally mounted to said hollow casing.

11. The assembly as set forth in claim 10 wherein said means for engaging and displacing said spring loaded arm includes a cam surface provided on said push button which engages a flexible finger member attached to said spring loaded arm to move said spring loaded arm about its axis and out of engagement with said complementary groove.

12. The assembly as set forth in claim 1 wherein said spring means associated with said switch actuator includes at least one coil spring mounted in surrounding relationship thereto.

13. The assembly as defined in claim 1 wherein said yieldable cam means includes a cam plate pivotally mounted to said hollow casing, but capable of being moved in planes parallel to and generally perpendicular to said switch actuator, second spring means resiliently urging said cam plate in first and second directions aligned respectively with said generally parallel and perpendicular planes, said pin means associated with said push button adapted to engage said cam plate to displace it in a third direction generally within the confines of said parallel direction and opposite to said first direction when said push button is depressed, said cam plate being moved in said third direction until said cam pin is positioned beneath a locking shoulder provided on said cam plate whereby said second spring means urges the cam plate in the first direction to a position of latching engagement with said pin means.

14. The assembly as defined in claim 13 and further including means provided on said cam plate for moving said cam plate in a fourth direction generally perpendicular to the switch actuator and opposite to said second direction upon further depression of said push button to move the pin means out of latching engagement with said cam plate.

15. An alternate action mechanism comprising, in combination, a hollow casing having open ends, a push button mounted in one end of said hollow casing, a switch actuator rod having spring means associated therewith for biasing at least a portion of said push button outwardly of one end of said hollow casing, said switch actuator rod extending beyond the other end of said hollow casing for operative engagement with at least one spring loaded depressor means of a switch fixedly mounted relative to said switch actuator, and means for alternatively holding said switch actuator rod in and out of operative engagement with said spring loaded depressor means including a yieldable cam plate assembly capable of being moved to a position of latching engagement with pin means associated with said push button when the latter is depressed a predetermined distance to position the switch actuator rod in operative engagement with said spring loaded depressor means, further depression of said push button causing said yieldable cam plate assembly to be moved out of latching engagement with said pin means to permit the return of said switch actuator rod.

16. A switch assembly comprising, in combination,
a hollow casing having open ends,
a bracket member attached to said casing adjacent one open end thereof and having a through opening communicating with said one open end,
at least one switch fixedly mounted to said bracket member and having spring loaded depressor means for controlling the movement of switch contacts mounted within said switch,
a push button mounted in the other end of said hollow casing, said push button having a laterally offset flange which underlies an overhanging shoulder adjacent said one end to prevent removal of said push button from said hollow casing,
a switch actuator having its upper end attached to said push button and its lower end extending beyond the through opening provided in said bracket member for operative engagement with said spring loaded depressor means,
coil spring means mounted in surrounding relationship to said switch actuator and adapted to be compressed upon the depression of said push button,
and a yieldable cam plate assembly mounted to said hollow casing and capable of being moved by said push button to a position of latching engagement therewith when said push button is depressed a predetermined amount to position and hold said switch actuator in operative engagement with the spring loaded depressor means of said switch.

17. The switch assembly as defined in claim 16 including means provided on said yieldable cam plate assembly which, upon further depression of said push button, moves said yieldable cam plate assembly out of latching engagement with said push button to permit return thereof to its initial position.

18. The switch assembly as defined in claim 16 wherein said yieldable cam plate assembly comprises a cam plate mounted on a pivot shaft which is attached to said hollow casing, said cam plate lying in a plane generally parallel to said switch actuator, said pivot shaft having a length greater than the thickness of said cam plate to permit oscillatory and lateral movement of said cam plate about and along the axis of said pivot shaft in first and second planes which respectively extend parallel to and perpendicular to said switch actuator, spring means for resiliently urging said cam plate in first and second directions aligned with said generally parallel and perpendicular planes, a camming edge extending along the upper surface of said cam plate which terminates along the side thereof in a locking shoulder, pin means attached to said push button and adapted to engage the camming edge of said cam plate to displace it in a third direction generally within the confines of said parallel plane and opposite to said first direction, said cam plate being moved in said third direction until said pin means engages an abutment formed on said cam plate in a position below and laterally outwardly offset from said locking shoulder whereby upon release of said push button the spring means moves said cam plate in the first direction to a position of latching engagement with said locking shoulder.

19. The switch assembly as defined in claim 18 and further including an opening provided in said cam plate below its locking shoulder whereby to permit further downward movement of said push button and displacement of said cam plate in its first direction when said pin means is positioned within said opening, and a ramp surface extending from the marginal portions of said cam plate opening and having an outer free extremity adjacent the lowermost portion of said opening for receiving the pin means during the movement of said cam plate in its first direction to guide the pin means along said ramp surface and cause relative separating movement between said cam plate and pin means when said push button is released.

20. The switch assembly as defined in claim 19 wherein the outer free extremity of said ramp surface is nearest said switch actuator and gently tapers toward the plane thereof to cause movement of said cam plate in a fourth direction generally perpendicular to said switch actuator and opposite to said second direction as said pin means rides along said ramp surface.

21. A switch assembly comprising, in combination,
a hollow casing having open ends,
a bracket member attached to said casing adjacent one open end thereof and having a through opening communicating with said one open end,
at least one switch fixedly mounted to said bracket member and having spring loaded depressor means for controlling the movement of switch contacts mounted within said switch,
a push button mounted in the other end of said hollow casing, said push button having a laterally offset flange which underlies an overhanging shoulder adjacent said one end to prevent removal of said push button from said hollow casing,
a switch actuator having its upper end attached to said push button and its lower end extending beyond the through opening provided in said bracket member for operative engagement with said spring loaded depressor means,
coil spring means mounted in surrounding relationship to said switch actuator and adapted to be compressed upon the depression of said push button,
means withholding movement of said switch actuator until a predetermined amount of compressive energy is built up in said spring means,
and a yieldable cam plate assembly mounted to said hollow casing and capable of being moved by said push button to a position of latching engagement therewith when said push button is depressed a predetermined amount to position and hold said switch actuator in operative engagement with the spring loaded depressor means of said switch.

References Cited by the Examiner

UNITED STATES PATENTS 2,321,212   6/1943   Johnson _____ 200—159 X

FOREIGN PATENTS 187,170   12/1955   Austria.

ROBERT K. SCHAEFER, *Primary Examiner.*

H. HOHAUSER, *Assistant Examiner.*